J. F. ZEMAN.
NUT AND BOLT LOCK.
APPLICATION FILED DEC. 16, 1916.
1,278,549.
Patented Sept. 10, 1918.
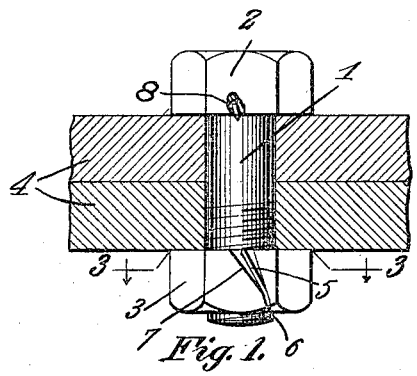
Fig. 1.
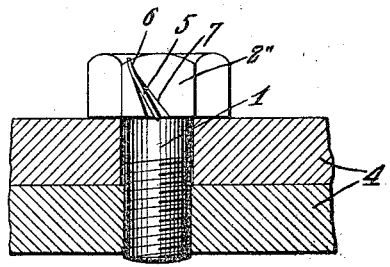
Fig. 4.
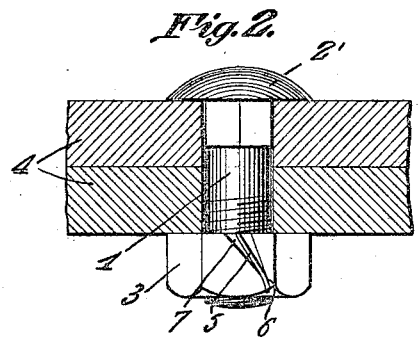
Fig. 2.
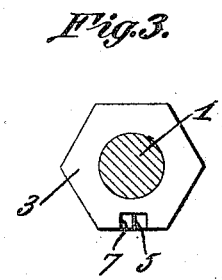
Fig. 3.
Fig. 6.
Fig. 5.
Joseph F. Zeman, INVENTOR
WITNESSES
John M. Dobie
Wm. T. Fowler
BY Richard Owen,
ATTORNEY

UNITED STATES PATENT OFFICE.

JOSEPH F. ZEMAN, OF CHARLOTTE, NORTH CAROLINA, ASSIGNOR OF ONE-HALF TO J. E. SIMMONS, OF CHARLOTTE, NORTH CAROLINA.

NUT AND BOLT LOCK.

1,278,549. Specification of Letters Patent. Patented Sept. 10, 1918.

Application filed December 16, 1916. Serial No. 137,385.

*To all whom it may concern:*

Be it known that I, JOSEPH F. ZEMAN, a citizen of the United States, residing at Charlotte, in the county of Mecklenburg and State of North Carolina, have invented certain new and useful Improvements in Nut and Bolt Locks, of which the following is a specification.

This invention relates to certain new and useful improvements in nut and bolt locks and has for its primary objects the provision of a device of this character which will be of extremely simple and inexpensive construction as well as highly efficient in use.

Another object resides in the provision of a nut and bolt lock which will be of such construction that the same may be readily applied or removed, as desired.

A further object resides in the provision of a nut and bolt lock in which the spring locking member may be mounted in such manner as to automatically lock with the surface with which it is engaged as the nut and the bolt are tightened but which may be readily engaged by a pointed member and withdrawn from the surface to permit the nut and bolt to be loosened or removed.

A still further object resides in the provision of a nut and bolt lock of the above stated character in which the spring locking member will be securely held by one hand in a substantially V-shaped recess in the side of the nut or bolt head.

With these and other objects in view, as will be more readily apparent as the description proceeds, the invention consists in the novel combination and arrangement of parts, as will be hereinafter more specifically set forth, pointed out in the appended claim and shown in the accompanying drawings.

In the drawings forming a part of this application, and in which like designating reference characters refer to corresponding parts throughout the several views, Figure 1 is an elevation of my improved form of nut lock in use Fig. 2 is a similar view, showing a different form of bolt with the member mounted therein to prevent rotation of the bolt Fig. 3 is a detail sectional view, substantially on the plane of line 3—3 of Fig. 1 looking in the direction indicated by the arrows and Fig. 4 is an elevation of a bolt with the spring locking member carried by the bolt head.

Figs. 5 and 6 are views of a locking washer that may be used in conjunction with my improved nut lock.

Referring more in detail to the drawings, 1 designates the shank and 2 the head of a bolt of conventional form and upon which is threaded the nut 3 after the bolt has been engaged through the members 4 to be fastened together.

In order to securely lock the nut 3 upon the bolt 1, I have provided a spring locking member 5, one end of which is securely fastened in the narrow end 6 of the substantially V-shaped recess 7 in one side of the nut 3. It will be understood that the wide end of the recess 7 opens upon the inner side of the nut 3 as shown clearly in the drawings, and the spring locking member 5 is of such length, that the free end thereof extends from the wide end of the recess 7 for biting engagement with the adjacent surface of the member 4 against which the nut 3 is threaded. This will cause the spring locking member 5 to bend in a direction opposite to the direction of rotation of the nut 3, securely locking the nut 3 upon the bolt 1 and preventing the nut from breaking loose.

When it is desired to remove the nut 3, it is simply necessary to insert the point of a knife blade or some other pointed instrument, in the recess 7 and force the free end of the spring locking member away from the member 4, leaving the nut 3 free to rotate toward the end of the bolt shank 1. It will therefore be seen that this form of nut lock may be readily assembled and the nut locked upon the bolt or the nut unlocked and removed from the bolt without injury to either the nut or bolt or to the member with which the spring locking member 5 is engaged.

When my nut lock is employed in connection with a bolt having a head of the type shown in Fig. 1 means must be provided to prevent rotation of the bolt. I have therefore shown the bolt head 2 as having a locking pin 8 positioned therein at an angle and having its point projecting from the under face of said head 2 to bite into the surface of the member 4 with which the head 2 is engaged. The locking pin 8 may be extended in such manner as to prevent rotation of the bolt in either direction desired and if found necessary, more than one locking pin may be employed, thereby making it possible to prevent rotation of the bolt in either direction.

The bolt shown in Fig. 2 is provided with a rounded head or cap 2' and adjacent said cap with an enlargement having a plurality of flat faces adapted to be disposed in a correspondingly shaped opening formed in the member 4 to prevent rotation of the bolt.

In Fig. 4 I have shown the spring locking member 5 as carried by the head 2'' of the bolt, the recess 7 being formed in the bolt head 2'' the same as in the nut 3 in Figs. 1 and 2, with the free end of the spring member 5 extended from the wide end of the recess 7 and pass the under face of said bolt head 2'. It will therefore be seen that as the bolt is threaded through the members 4, the free end of the locking member 5 will bite into the surface of the member 4 with which the bolt head 2' is engaged.

It will evident that, whether the spring locking member 5 is carried by the nut 3 or the bolt head, the free end of said spring locking member 5 may be either flat or beveled, as desired.

While the form of the invention shown and described is believed to be the preferred embodiment thereof, it is nevertheless to be understood that minor changes therein in the detail of construction and arrangement of parts may be resorted to within the scope of the appended claim without departing from the spirit of the invention.

What I claim as new and desire to protect by Letters Patent, is:—

A nut and bolt lock comprising a rotatable member provided with a plurality of flat side faces, one of said flat side faces having a substantially V-shaped groove extending diagonally thereacross, with the smaller end of the groove opening into the outer face of the rotatable member and the larger end of the groove opening into the inner face of said member, a flat spring locking member having one end secured in the narrow end of said recess, and the opposite or free end thereof projecting from the wide end of the recess for biting engagement with a stationary object to lock said rotatable member in adjusted position, said locking member being normally inclined throughout its length with respect to the longitudinal axis of said rotatable member.

In testimony whereof I affix my signature in presence of two witnesses.

JOSEPH F. ZEMAN.

Witnesses:
JOSEPH A. JONES,
R. C. JOHNSON.

Copies of this patent may be obtained for five cents each, by addressing the "Commissioner of Patents, Washington, D. C."